United States Patent
Jungbecker et al.

(10) Patent No.: US 12,454,253 B2
(45) Date of Patent: Oct. 28, 2025

(54) ELECTROMECHANICAL BRAKE DEVICE

(71) Applicant: Continental Automotive Technologies GmbH, Hannover (DE)

(72) Inventors: Johann Jungbecker, Badenheim (DE); Andreas Kircher, Darmstadt (DE); Andreas Schirling, Darmstadt (DE); Peter Schack, Seligenstadt (DE); Paul Linhoff, Neu-Anspach (DE); Marco Besier, Bad Schwalbach (DE); Jürgen Böhm, Oberneisen (DE)

(73) Assignee: Continental Automotive Technologies GmbH, Hannover (DE)

( * ) Notice: Subject to any disclaimer, the term of this patent is extended or adjusted under 35 U.S.C. 154(b) by 416 days.

(21) Appl. No.: 18/005,498

(22) PCT Filed: Jul. 8, 2021

(86) PCT No.: PCT/DE2021/200091
§ 371 (c)(1),
(2) Date: Jan. 13, 2023

(87) PCT Pub. No.: WO2022/012722
PCT Pub. Date: Jan. 20, 2022

(65) Prior Publication Data
US 2023/0271593 A1    Aug. 31, 2023

(30) Foreign Application Priority Data
Jul. 14, 2020    (DE) ..................... 10 2020 208 769.5

(51) Int. Cl.
*F16D 55/30*    (2006.01)
*B60T 7/10*    (2006.01)
(Continued)

(52) U.S. Cl.
CPC ............ *B60T 7/107* (2013.01); *B60T 13/662* (2013.01); *B60T 13/741* (2013.01); *B60T 17/22* (2013.01); *B60T 7/122* (2013.01)

(58) Field of Classification Search
CPC ........ B60T 7/107; B60T 7/122; B60T 13/662; B60T 13/741; B60T 17/22; F16D 55/30;
(Continued)

(56) References Cited

U.S. PATENT DOCUMENTS

| 5,000,295 A | 3/1991 | Fargier |
| 5,000,521 A | 3/1991 | Majima |

(Continued)

FOREIGN PATENT DOCUMENTS

| DE | 19511811 A1 | 10/1996 |
| DE | 19640995 C2 | 7/1999 |

(Continued)

OTHER PUBLICATIONS

German Search Report dated Apr. 20, 2021 for the counterpart German Patent Application No. 10 2020 208 769.5.

(Continued)

*Primary Examiner* — Thomas W Irvin (57) ABSTRACT

An electromechanical brake device has a brake caliper and a pressure piston mounted in the brake caliper such that it can move in a clamping direction, wherein the brake device has an electromechanical clamping device, wherein the clamping device is supported, on one side, on the pressure piston and is designed to apply to the pressure piston a force acting in the clamping direction. It is provided that the brake device has at least one hydraulically sealed, fluid-filled cavity, wherein the clamping device is supported, on the other side, indirectly on the brake caliper via the fluid-filled cavity, and wherein a pressure sensor is hydraulically con- (Continued)

nected to the fluid-filled cavity and is designed to calculate the fluid pressure inside the fluid-filled cavity.

21 Claims, 6 Drawing Sheets

(51) Int. Cl.
  *B60T 13/66* (2006.01)
  *B60T 13/74* (2006.01)
  *B60T 17/22* (2006.01)
  *F16D 65/18* (2006.01)
  *B60T 7/12* (2006.01)

(58) Field of Classification Search
  CPC . F16D 65/18; F16D 2066/005; F16D 2125/40
  USPC ........................................................ 188/72.8
  See application file for complete search history.

(56) References Cited

U.S. PATENT DOCUMENTS

| | | | |
|---|---|---|---|
| 5,645,143 A | 7/1997 | Mohr et al. | |
| 6,176,352 B1 | 1/2001 | Maron et al. | |
| 6,598,714 B1* | 7/2003 | Rinsma | F16D 65/18 |
| | | | 188/71.9 |
| 7,401,686 B2* | 7/2008 | Severinsson | B60T 17/22 |
| | | | 188/1.11 E |
| 10,179,573 B2* | 1/2019 | Baehrle-Miller | B60T 8/171 |
| 10,471,946 B2* | 11/2019 | Baehrle-Miller | B60T 13/741 |
| 10,821,952 B2* | 11/2020 | Baehrle-Miller | F16D 55/225 |
| 11,186,291 B2* | 11/2021 | Meister | B60W 10/188 |
| 12,162,448 B2* | 12/2024 | Urano | B60T 13/741 |
| 2004/0154877 A1 | 8/2004 | Severinsson | |
| 2004/0195055 A1* | 10/2004 | Gilles | F16D 66/00 |
| | | | 188/73.1 |
| 2006/0267402 A1 | 11/2006 | Leiter et al. | |
| 2018/0086325 A1 | 3/2018 | Mannherz | |
| 2019/0389480 A1* | 12/2019 | Meister | B60W 30/18109 |

FOREIGN PATENT DOCUMENTS

| | | | |
|---|---|---|---|
| DE | 10296882 B4 | 3/2019 | |
| EP | 1141686 B1 | 2/2006 | |
| WO | WO-8804741 A1 * | 6/1988 | ............. F16D 65/18 |
| WO | 2005073043 A1 | 8/2005 | |

OTHER PUBLICATIONS

The International Search Report and the Written Opinion of the International Searching Authority mailed on Sep. 23, 2021 for the counterpart PCT Application No. PCT/DE2021/200091.

* cited by examiner

ELECTROMECHANICAL BRAKE DEVICE

TECHNICAL FIELD

The invention relates to an electromechanical brake device.

BACKGROUND

Electromechanical brake devices are known in the prior art. In contrast to the case of a conventional hydraulic brake, in an electromechanical brake device a force in the direction of the respective friction partner is applied to brake linings by means of an electromechanical clamping device in order to generate the desired deceleration torque. In the case of a hydraulic brake, the control of the generated braking torque is effected via the fluid pressure, applied to generate the braking torque, in the brake fluid. However, in the case of an electromechanical brake of the structure described, this is initially not possible.

Instead, different methods are usually adopted in the prior art in order to calculate the clamping force applied by an electromechanical brake and using this information to control the activation of the electromechanical brake on the basis of a braking requirement. A first approach consists in monitoring the operating parameters of the electromechanical drive and calculating the currently applied clamping force from the values thus calculated, in particular the motor current and the motor position. Such an approach is described, for example, in EP 1 141 686 B1 of the Applicant.

A second known approach consists in measuring the forces acting in a brake caliper or activating mechanism by means of corresponding force sensors and thus drawing a conclusion about the currently acting clamping force. In this respect, for example, DE 196 40 995 C2 of the Applicant describes that it is possible to draw a conclusion about the clamping force exerted from a deformation of the clamping device or an arm which supports the clamping force.

SUMMARY

An alternative concept for determining the clamping force in an electromechanical brake device, is characterized by improved accuracy.

An electromechanical brake device has a brake caliper and a pressure piston mounted in the brake caliper such that it can move in a clamping direction, wherein the brake device has an electromechanical clamping device, wherein the clamping device is supported, on one side, on the pressure piston and is designed to apply to the pressure piston a force acting in the clamping direction. It is provided here that the brake device has at least one hydraulically sealed, fluid-filled cavity, wherein the clamping device is supported, on another side, indirectly on the brake caliper via the fluid-filled cavity, and wherein a pressure sensor is hydraulically connected to the fluid-filled cavity and is designed to calculate the fluid pressure inside the fluid-filled cavity.

The idea is making use of the determination of the clamping force from a hydraulic pressure, which is known for hydraulic brake devices, to determine the clamping force of an electromechanical brake device as well. This is achieved, by virtue of supporting the clamping device on a fluid-filled cavity, by the clamping force acting on the pressure piston of the brake device likewise acting on the fluid-filled cavity as well and thus causing an increase in pressure within the fluid. The fluid-filled cavity accordingly acts in the manner of a hydraulic pressure cushion. Knowing the geometry of the corresponding elements, i.e. the cavity and the pressure sensor, a conclusion can be drawn from the fluid pressure about the acting clamping force. The clamping force calculated in this way can then in turn be fed to a control unit of the brake device in order to control a corresponding clamping force regulator.

An environmentally friendly liquid which is hydraulically viscous over the whole relevant temperature range may be used here as the fluid for the cavity.

Determining a clamping force from a fluid pressure has per se been known for a long time and accordingly is well developed. Consequently, known technology can be employed to implement the approach according to the invention, for example in terms of the pressure sensors used and also the corresponding regulation of the brake device based on measured pressure values. This enables precise determination of the clamping force at the same time as the use of cost-effective technology.

The "clamping direction" may be understood to be that direction of movement of the pressure piston which causes brake linings arranged on the pressure piston to be brought into engagement with the corresponding friction partners. The term "pressure piston" may be understood here as non-limiting in terms of the geometrical shape of the corresponding element. A pressure piston is thus not necessarily piston-shaped. Instead, a pressure piston is to be understood as that element which is displaced from a rest position when the brake device is activated, the friction partners of the brake devices coming into engagement as a consequence of the displacement.

The above described principle of drawing a conclusion about the clamping force of an electromechanical brake device from considering a hydraulic pressure can here be applied in principle to any structure of an electromechanical brake device in which such a clamping force is applied to a pressure piston within the sense of the above definition by means of a clamping device. According to one embodiment, however, the clamping device has an electromotively driven threaded spindle and a spindle nut, wherein the spindle nut is supported on the pressure piston in the clamping direction and wherein the threaded spindle is supported on the brake caliper counter to the clamping direction via the fluid-filled cavity. When such a brake device is activated, the spindle nut and therefore the pressure piston are displaced in the clamping direction by rotation of the threaded spindle, and a force in the clamping direction is applied to them. The reaction force generated when a clamping force is applied to the pressure piston is thus completely reproduced as fluid pressure because the threaded spindle is supported on the fluid-filled cavity. Precise determination of the clamping force from the calculated pressure in the fluid-filled cavity is thus possible. The spindle drive described is here preferably designed as a low-friction ball screw.

It is also possible to use a plurality of pressure sensors in order to calculate the pressure prevailing in the fluid-filled cavity. In this way, redundancy concerning the determination of the clamping force of the friction brake can be created such that it continues to be possible to reliably calculate the pressure prevailing in the fluid-filled cavity and regulate the clamping force of the brake device accordingly even in the event of failure of one of the pressure sensors.

According to a further embodiment, it is thus provided that the spindle nut is arranged at least partially in a recess inside the pressure piston. In particular, the spindle nut can also be arranged completely inside the pressure piston such that force can be transmitted from the spindle nut to the pressure piston with as little play as possible and as securely as possible. Part of the threaded spindle thus logically also extends through the pressure piston. In order to ensure sufficient displaceability of the spindle nut and therefore the pressure piston on the threaded spindle, a socket for the threaded spindle may be arranged behind the spindle nut in the clamping direction, wherein the depth of the socket also establishes the maximum displacement travel of the spindle nut.

For support of the threaded spindle on the cavity, according to a further embodiment it is provided that the threaded spindle has a first longitudinal section with a first diameter and a second longitudinal section adjoining the first longitudinal section, wherein an external thread with a diameter greater than the first diameter is formed in the second longitudinal section. According to a further embodiment, it is here moreover provided that a support ring is arranged on the first longitudinal section of the threaded spindle, wherein the internal diameter of the support ring is smaller than the external diameter of the second longitudinal section of the threaded spindle such that the threaded spindle, via the support ring, is supported indirectly via the fluid-filled cavity on the brake caliper counter to the clamping direction.

The diameter of the first longitudinal section of the threaded spindle and accordingly the internal diameter of the support ring may be smaller than the core diameter of the threaded spindle. In this case, the support takes place not on the thread per se but on the usually more stable core region of the spindle. For example, damage to the thread when high forces are exerted can thus be prevented.

As has already been explained above, the concept for determining the clamping force is based on the fact that, because the clamping device is supported on a fluid-filled cavity, the force caused on the pressure piston by the clamping device causes an increase in pressure in the liquid which is contained in the cavity. To achieve this, the cavity may be designed such that the volume of the cavity can be changed easily, i.e. with as little mechanical resistance as possible, when a force acts in particular in the clamping direction. In this case, a reduction in the pressure generated is reduced by some of the force which acts having to be used to deform the cavity and consequently the measuring accuracy is improved.

In an embodiment, such easy deformability of the cavity is ensured by the fluid-filled cavity being formed between a first and a second pressure sleeve, wherein the first pressure sleeve is supported on the brake caliper counter to the clamping direction, whilst the second pressure sleeve is supported on the clamping device, for example on the support ring, in the clamping direction. The pressure sleeves are here arranged in the brake device such that they can move independently of each other in the clamping direction. The term "sleeve" is here not to be understood as limiting in terms of the geometry of the corresponding element.

If in this arrangement a force on the pressure piston in the clamping direction is caused by the clamping device, a corresponding reaction force acts at the same time on the second pressure sleeve, which propels the second pressure sleeve toward the first pressure sleeve and consequently causes compression of the cavity formed between the pressure sleeves. Because the cavity is in turn sealed fluidtightly, in this way the clamping force caused by the clamping device is reproduced in the form of pressure inside the cavity.

According to a further embodiment, it is provided here that the first pressure sleeve is fastened to the brake caliper such that the first pressure sleeve cannot be displaced relative to the brake caliper. It can thus be prevented that, when the clamping process begins, the first pressure sleeve first is displaced counter to the clamping direction so far that it comes to lie on a part of the brake caliper in such a way that further displacement counter to the clamping direction is blocked. Such a displacement could result in inaccurate measurements of the measured pressure inside the cavity and therefore in an incorrect determination of the clamping force from the measured pressure.

According to a further embodiment, it is moreover provided that the first pressure sleeve and the second pressure sleeve each have an opening, the tensioning device extending through the opening. When a spindle drive is used, for example the threaded spindle here extends through the central opening. The respective opening is here preferably in each case centered in the pressure sleeves. Compact integration of the fluid-filled cavity into the structure of the electromechanical brake is possible by virtue of such a structure.

As has already been explained above, in the described configuration of a cavity by means of two pressure sleeves, compression of the cavity enclosed between the pressure sleeves is obtained by a relative movement between the pressure sleeves. To achieve this, according to an embodiment it is proposed that the second pressure sleeve is mounted in the first pressure sleeve such that it is displaceable in the clamping direction. The first pressure sleeve may be fixed on the brake caliper. The second pressure sleeve may than be mounted in the first pressure sleeve such that the second pressure sleeve can move only in the clamping direction.

For this purpose, according to a further embodiment it is moreover provided that the second pressure sleeve is mounted on plain bearings on the first pressure sleeve on at least two bearing faces, wherein sealing elements which seal the cavity formed between the pressure sleeves fluidtightly are arranged in the region of the bearing faces on the first pressure sleeve and/or the second pressure sleeve. The sealing elements are preferably sealing rings which can be arranged, for example, in grooves which are formed in the first and/or second pressure sleeve in the region of the bearing faces. A first one of the sealing elements may be formed in or on the first pressure sleeve, while a second one of the sealing elements is fastened in or on the second pressure sleeve.

According to a further embodiment, it is moreover provided that the first and the second pressure sleeve each have a pot-shaped design, wherein at least a part of the clamping device is arranged inside the pot shape. A compact design of the electromechanical brake device can thus be achieved, for example with respect to the extent of the brake device in its clamping direction. A "pot shape" is thus understood to be an for example axially symmetrical geometry which is open on one side and has a base surface and surrounding side walls adjoining the base surface radially on the outside. The extent of the pot shape in the radial direction can thus be greater or smaller than the extent of the pot shape in the axial direction.

According to another embodiment, it is provided here that the pressure sensor is arranged in a side wall of the pot shape of the first pressure sleeve. In this way, the arrangement of the pressure sensor does not obstruct the configuration of the clamping device per se because the pressure sensor is arranged offset laterally next to an activation axis of the clamping device.

As an alternative to the above described embodiment with pot-shaped pressure sleeves, according to a further embodiment it is provided that the first pressure sleeve and the second pressure sleeve each have a plate-shaped design, wherein the pressure sleeves are connected to each other via membranes at their radial outer rims and at the rims of their respective openings such that the cavity formed between the pressure sleeves is sealed fluidtightly by the membranes. A plate shape may be understood to be a concave disk shape, the extent of which in the axial direction is smaller than the extent in the radial direction.

For example bellows, which are arranged in each case on a radial outer edge of the plate shape and, in the case of a centered opening inside the plate shape as described above, in the region of precisely this opening can here be used as the membranes. The configuration of the pressure sleeves as a plate shape and therefore the arrangement for determining the clamping force can be scaled because the annular surfaces of the plate shapes can be adapted to the clamping forces occurring in the corresponding brake device. The membranes can here be welded to the pressure sleeves for example at their contact points with the pressure sleeves.

According to a further embodiment, it is moreover provided here that the pressure sensor is arranged in the plate shape of the first pressure sleeve between the membranes.

In order to enable the pressure sensor to be replaced in the event of a defective pressure sensor, according to a further embodiment it is moreover provided that the pressure sensor is screwed into the first pressure sleeve.

The pressure inside the cavity, calculated by the pressure sensor, can here be communicated to a clamping force regulator of the brake device by means of a integrated interface. A control unit of the pressure sensors can here also be integrated into the control system of the brake device.

BRIEF DESCRIPTION OF THE DRAWINGS

The present disclosure will become more fully understood from the detailed description and the accompanying drawings, wherein.

DETAILED DESCRIPTION

Features that are similar or identical to each other are denoted below by the same reference numerals.

Figure 1:
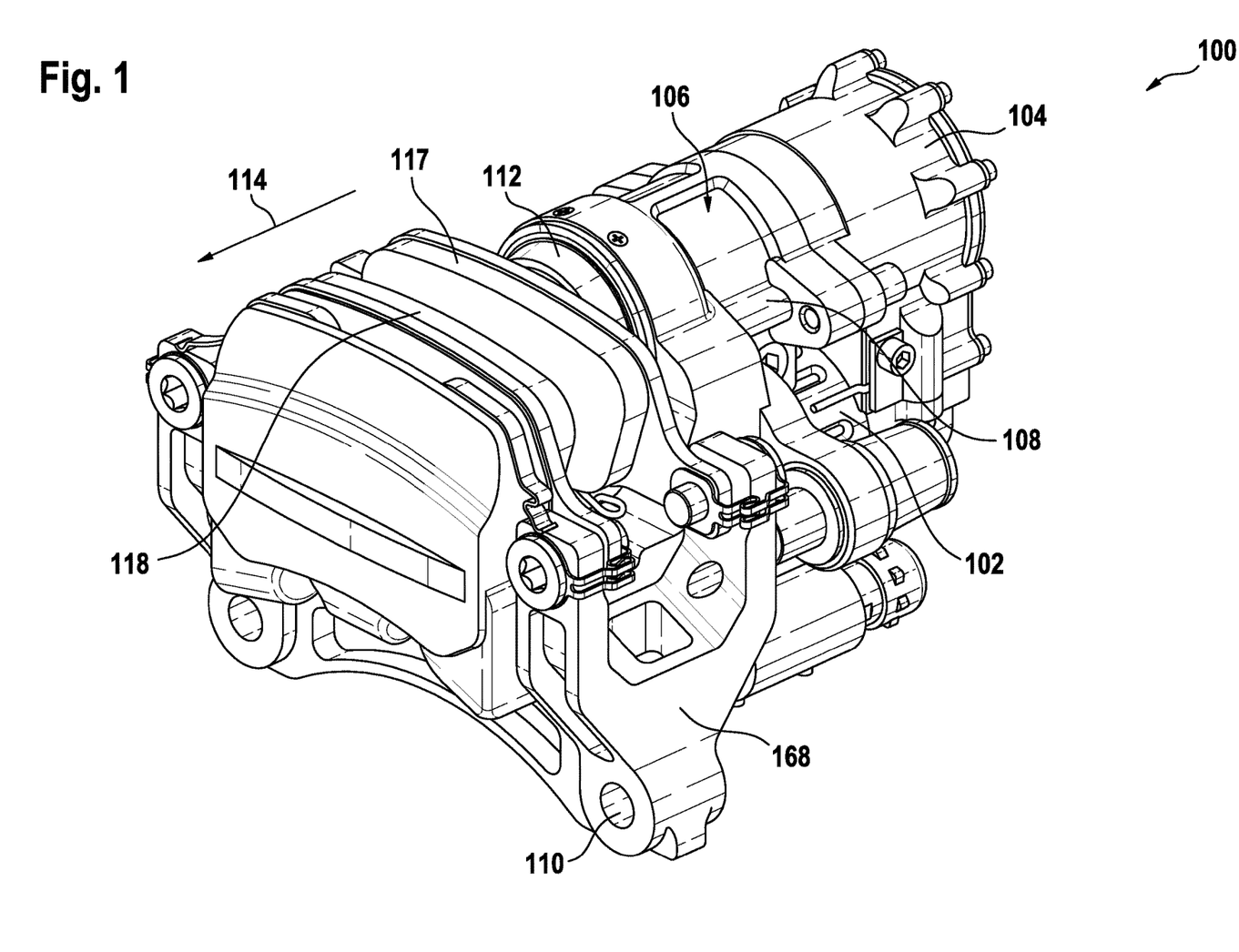
FIG. 1 shows a perspective view of an exemplary electromechanical brake device.

FIG. 1 shows a perspective view of an exemplary electromechanical brake device 100 which is designed in the embodiment illustrated here as a floating-caliper disk brake. The brake device 100 has an electric motor 102 which is connected via a gearbox 104 to a clamping device 106 which is designed in the embodiment illustrated here as a rotation-translation gearbox in the form of a spindle drive. This is explained below in more detail with reference to FIGS. 2 and 4.

The arrangement consisting of the electric motor 102, gearbox 104, and clamping device 106 is here arranged on a brake caliper 108 which can be fastened via a floating mounting in a brake caliper holder 168 with corresponding fastening points 110 to the wheel suspension of a vehicle. A pressure piston 112 is arranged in the brake caliper 108 such that the pressure piston 112 can be moved in a clamping direction 114 by a corresponding actuation of the electric motor 102 and a resulting activation of the clamping device 106.

A first friction lining 116, which is moved toward a second friction lining 118 when the pressure piston 112 moves in the clamping direction 114, is in turn arranged on the pressure piston 112. If the brake device 100 is fitted on a vehicle, a brake disk rigidly connected to the vehicle wheel is moreover arranged between the friction linings 116 and 118 such that the first friction lining 116 comes into contact with the brake disk in the case of sufficient displacement of the first friction lining 116 in the clamping direction. If the clamping device 106 is thus activated further, the second friction lining 118 is moved counter to the clamping direction 114, i.e. toward a brake disk arranged between the friction linings 116 and 118, until the two friction linings 116 and 118 bear against the brake disk.

Beyond this point, when the clamping device 106 is activated further, the friction linings 116 and 118 are pressed against the brake disk such that a deceleration torque which slows down the vehicle is caused on the vehicle wheel. In order to control such an electromechanical brake device 100 to implement a defined braking requirement, it is necessary here to calculate precisely with what force the friction linings 116 and 118 are pressed against the brake disk.

According to the invention, to achieve this it is provided that the brake device 100 has at least one hydraulically sealed, fluid-filled cavity, wherein the clamping device 106 is, in addition to support on the pressure piston 112, supported on the other side indirectly on the brake caliper 108 via the fluid-filled cavity. A pressure sensor is thus hydraulically connected to the fluid-filled cavity and is designed to calculate the fluid pressure inside the fluid-filled cavity. Two embodiments of this approach are explained in detail below by way of example with reference to FIGS. 2 and 5.

Figure 2:
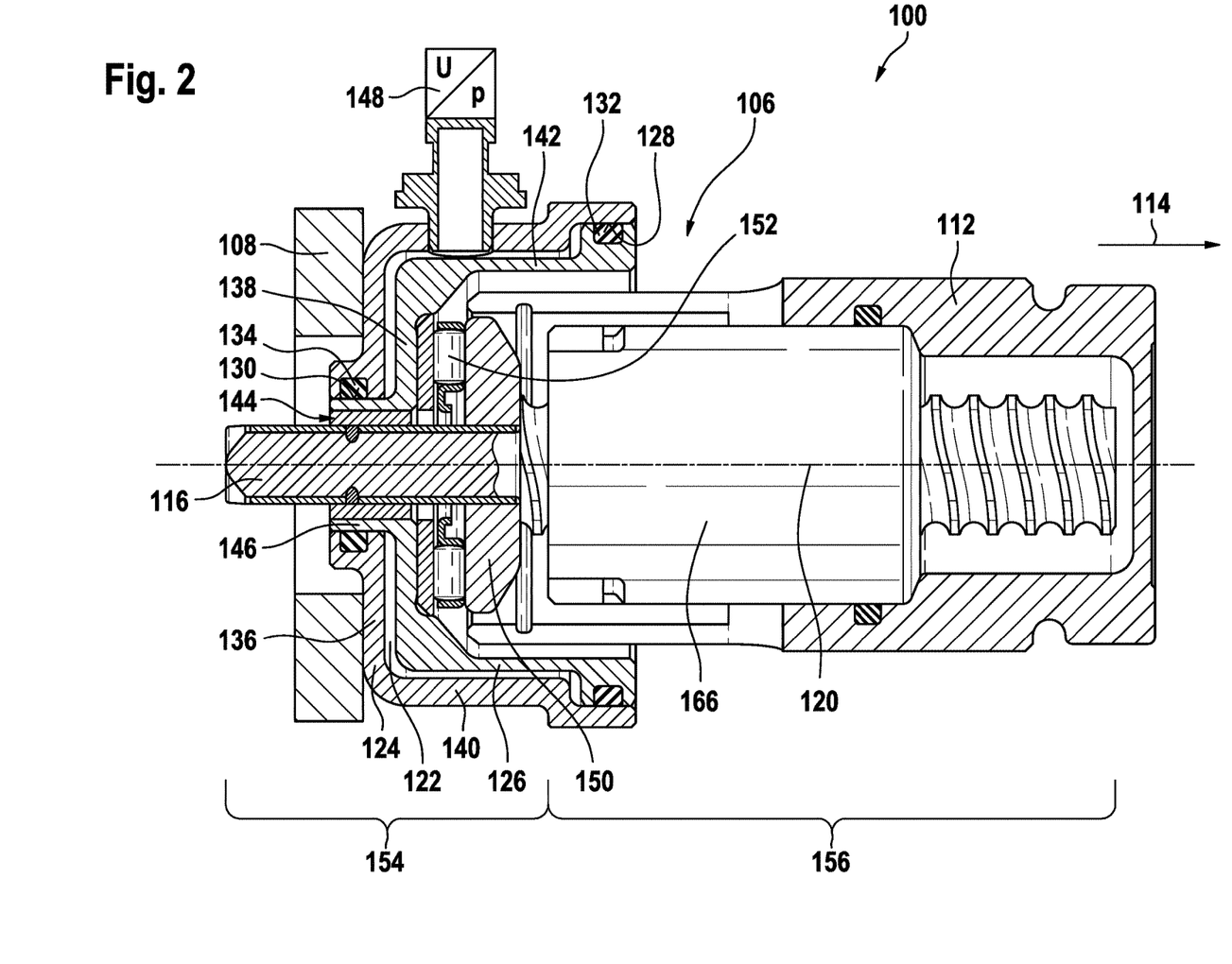
FIG. 2 shows a view in section of a subregion of a first exemplary brake device.

FIG. 2 here shows a view in section of a subregion of a first exemplary brake device 100. For reasons of clarity, only those elements of the brake device 100 which are relevant for the embodiment are illustrated here.

As already explained above, the brake device 100 has a clamping device 106 which is designed to apply a force to the pressure piston 112 in a clamping direction 114. To do this, the clamping device 106 has a spindle drive which has a threaded spindle 116 and a spindle nut 166 arranged on the threaded spindle 116. The threaded spindle 116 is here, as explained above, connected via a gearbox 104 which is not illustrated to the electric motor 102 which is also not illustrated such that the threaded spindle 116 can be set in rotation about its longitudinal axis 120 by corresponding actuation of the electric motor 102. The spindle nut 166 is here partly arranged inside the pressure piston 112 and is supported on the pressure piston 112 in the clamping direction. The spindle nut 166 is moreover secured against twisting about the longitudinal axis of the threaded spindle 116 such that rotation of the threaded spindle 116 causes displacement of the spindle nut 166 and therefore the pressure piston 112 in the clamping direction 114. The spindle drive may be designed as a low-friction ball screw.

In addition to support of the spindle nut 166 and therefore the clamping device 106 on the pressure piston 112 in the clamping direction 114, the clamping device 106 is supported on a fluid-filled cavity 122 counter to the clamping direction. The fluid-filled cavity 122 is here formed between two pot-shaped pressure sleeves 124 and 126 in the embodiment illustrated. A first one of the pressure sleeves 124 is here supported on the brake caliper 108 counter to the clamping direction 114. The second pressure sleeve 126 is mounted in the first pressure sleeve 124 such that it can be displaced in the clamping direction 114. For this purpose, the first and the second pressure sleeve 124 and 126 have bearing faces 128 and 130 on which the pressure sleeves 124 and 126 are mounted on plain bearings such that they can be displaced in the clamping direction 114.

The cavity 122 formed between the pressure sleeves 124 and 126 is here sealed fluidtightly via sealing elements 132 and 134 formed as sealing rings, wherein the sealing elements 132 and 134 are each arranged in corresponding grooves which are formed in the pressure sleeves 124 and 126. The sealing elements 132 and 134 are here arranged in the region of the bearing faces 128 and 130 of the pressure sleeves 124 and 126 and form plain bearings together with the bearing faces 128 and 130.

The pot-shaped pressure sleeves 124 and 126 have in their geometry in each case a base surface 136 and 138 and a surrounding side wall 140 and 142. In each case one centered opening 144, through which the threaded spindle 116 extends, is here formed in the base surfaces 136 and 138 of the pressure sleeves 124 and 126. The second pressure sleeve 126 here has, in the region of the opening 144, a projection 146 which extends counter to the clamping direction 114, projects into the opening 144 of the first pressure sleeve 124, and on the radial outside of which the bearing face 130 is formed. One of the plain bearings is thus formed with a sealing element 134 arranged in a groove of the first pressure sleeve 124. The second plain bearing is formed in the side walls 140 and 142 on their axial end regions in the clamping direction 114. For this purpose, formed on the inner face of the side wall 140 of the first pressure sleeve 124 is a bearing face on which a sealing element 132 can slide which is arranged in a groove which is formed in the side wall 142 of the second pressure sleeve 126.

A pressure sensor 148, which is designed to measure the fluid pressure prevailing in the cavity 122, is moreover arranged in the side wall 140 of the first pressure sleeve 124. The cavity 122 may be filled with a hydraulic liquid. The illustration of an individual element as a pressure sensor 148 is to be understood here as non-limiting. Instead, in the arrangement illustrated, a plurality of pressure sensors 148 can also be hydraulically connected to the cavity 122 such that redundancy is created in the calculation of the pressure prevailing in the cavity 122.

As has already been explained above, the spindle nut 166 is arranged on the threaded spindle 116 such that it can be displaced non-rotationally and axially along the threaded spindle 116 relative to the brake caliper 108 such that, when the threaded spindle 116 rotates, it causes the spindle nut 166 and therefore the pressure piston 112 to be displaced. When the spindle nut 166 is displaced in the clamping direction, it creates a reaction force counter to the clamping direction 114 which acts on the threaded spindle 116. In order to support this force, arranged on the threaded spindle 116 is a support ring 150 which is designed to absorb a force acting counter to the clamping device 114 and is supported on the second pressure sleeve 126. An axial bearing 152 for absorbing the forces which occur is here formed between the support ring 150 and the second pressure sleeve 126.

In order to transmit the forces acting on the threaded spindle 116 in the axial direction to the support ring 150, the threaded spindle 116 has two longitudinal sections with a different diameter. The diameter of the threaded spindle 116 in a first longitudinal section 154 is thus smaller than in a second longitudinal section 156, wherein the first longitudinal section 154 extends from the rear end, i.e. that facing the gearbox, of the threaded spindle 116. The external thread of the threaded spindle 116 is here formed in the second longitudinal section 156, wherein the core diameter of the thread is greater than the diameter of the threaded spindle 116 in the first longitudinal section 154. The internal diameter of the support ring 150 is here smaller than the core diameter of the second longitudinal section 156 but greater than the diameter of the first longitudinal section 154 such that the support ring 150 is supported in the clamping direction 114 on the transition between the longitudinal sections 154 and 156.

If in this arrangement a force is caused on the spindle nut 166 and therefore on the pressure piston 112 by a corresponding actuation of the electric motor 102, precisely this force is likewise also transmitted to the second pressure sleeve 126. As a result, the cavity 122 and the fluid situated inside it is pressurized. The pressure which thus occurs is in turn detected by the pressure sensor 148 such that it is possible to calculate from the calculated pressure the clamping force which currently acts on the pressure piston 112 and therefore on a friction lining 116 arranged on the pressure piston 112.

Figure 3:
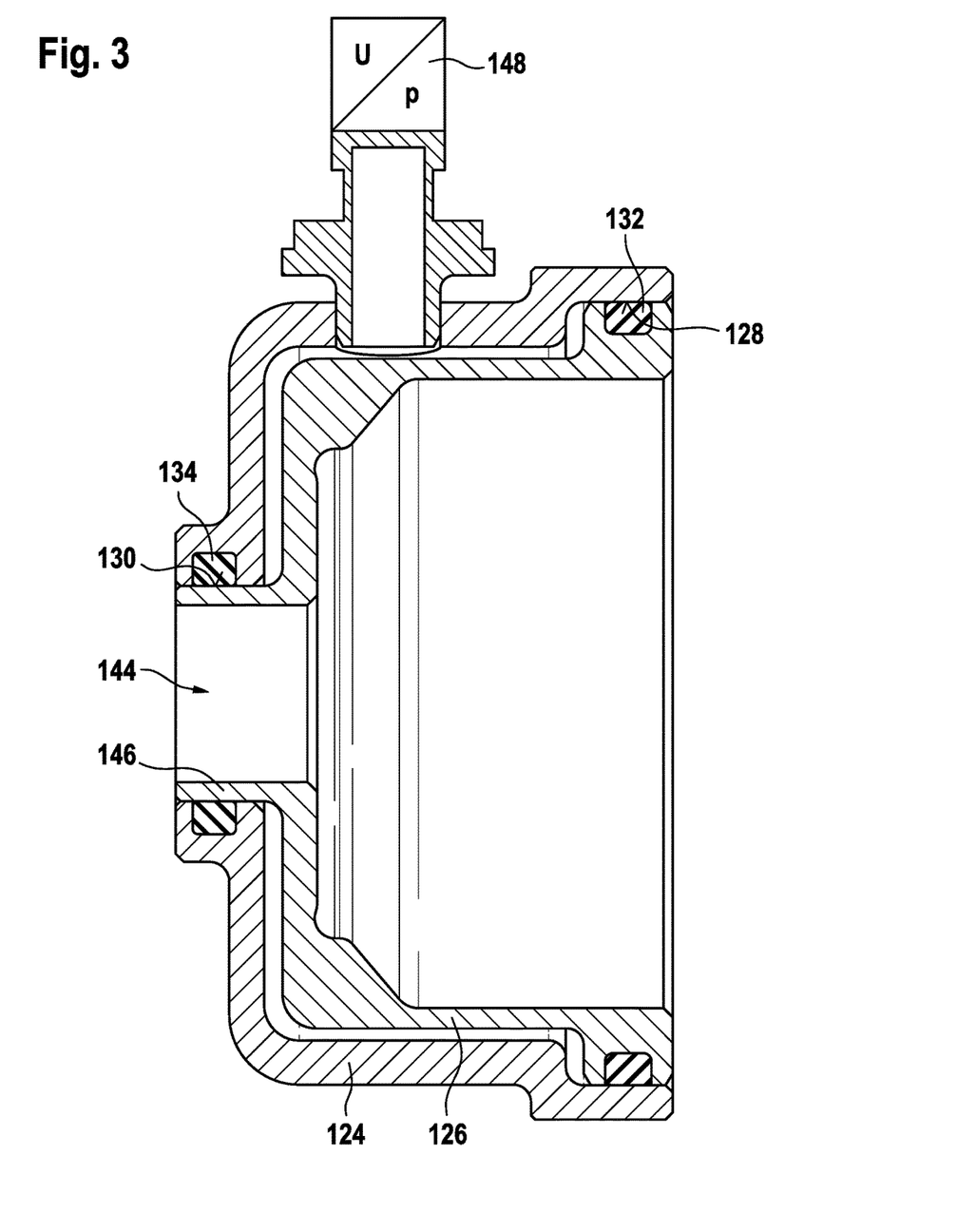
FIG. 3 shows a detailed view of the pressure sleeves used in FIG. 2.

FIG. 3 shows again the arrangement of the two pressure sleeves 124 and 126 but without the clamping device arranged therein.

Figure 4:
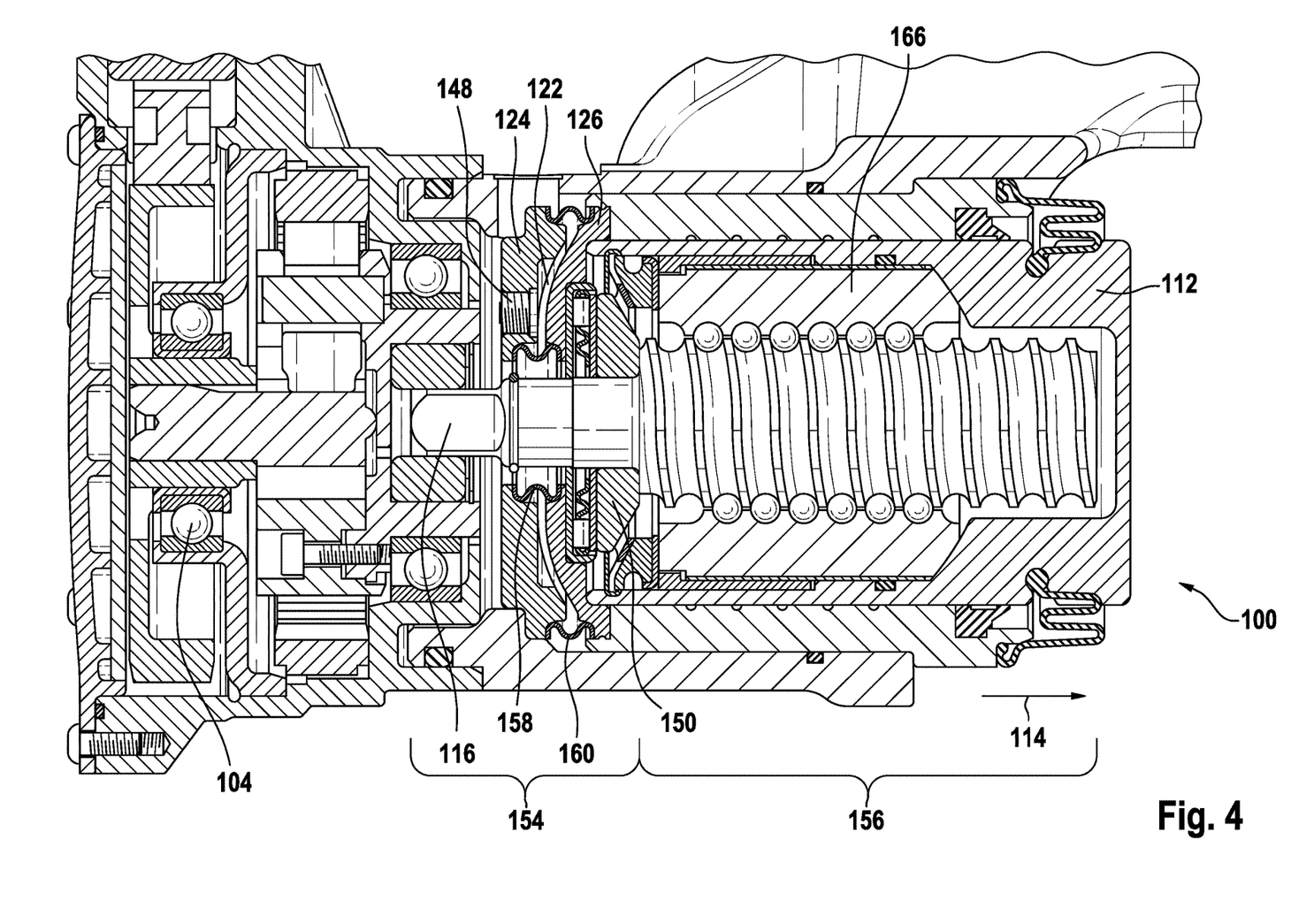
FIG. 4 shows a view in section of a subregion of a second exemplary brake device.

FIG. 4 shows a view in section of a second embodiment of a brake device 100. The brake device 100 illustrated here differs from the brake device 100 described above with reference to FIGS. 2 and 3 essentially in a different embodiment of the pressure sleeves 124 and 126. Thus, in this embodiment, the pressure sleeves 124 and 126 have a plate-shaped design, wherein the first pressure sleeve 124 is in turn supported on the brake caliper. The second pressure sleeve 126 is mounted such that it can be displaced on the first longitudinal section 154 of the threaded spindle 116 in the activating direction 114. Here too, the threaded spindle 116 is in turn supported on the second pressure sleeve 126 via a support ring 150 counter to the clamping direction 114 such that a force acting on the pressure piston 112 is transmitted to the second pressure sleeve 126.

Also in this embodiment, a force is applied to a fluidtightly sealed cavity 122 formed between the pressure sleeves 124 and 126 such that the force is reflected in a corresponding change in the pressure prevailing in the cavity 122. The cavity 122 is here, unlike in the above described embodiment, bounded by the pressure sleeves 124 and 126 on one side and by membranes 158 and 160 arranged on the rims of the pressure sleeves. This is illustrated in further detail in FIG. 5.

Figure 5A:
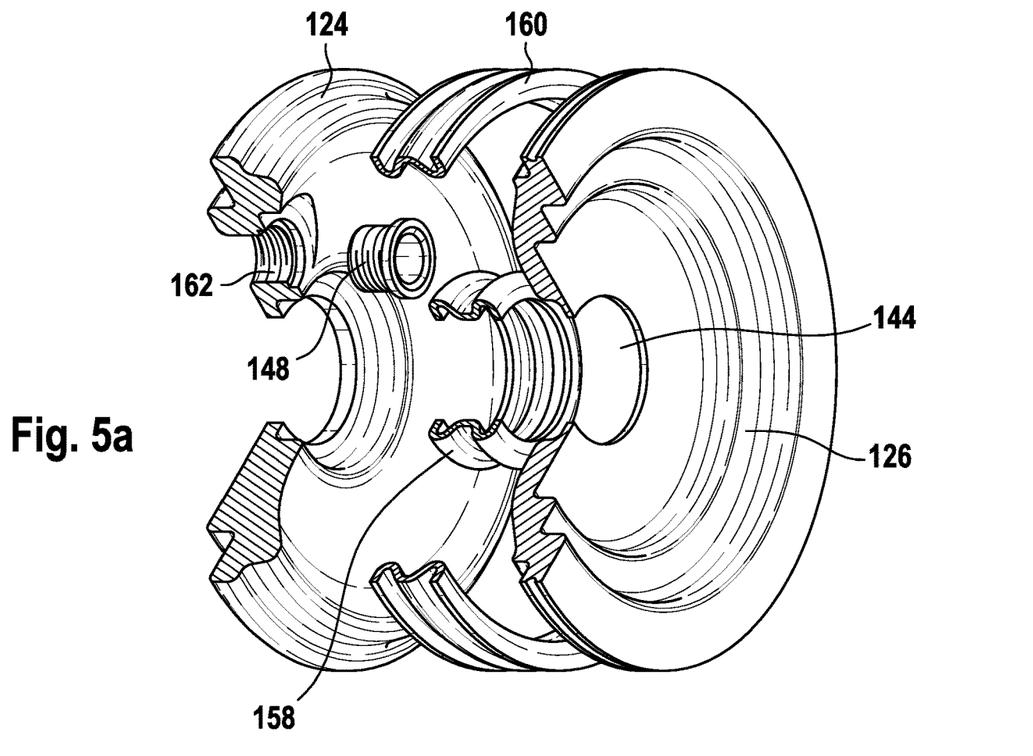
FIG. 5 shows two detailed views of the pressure sleeves used in FIG. 4.
Figure 5B:
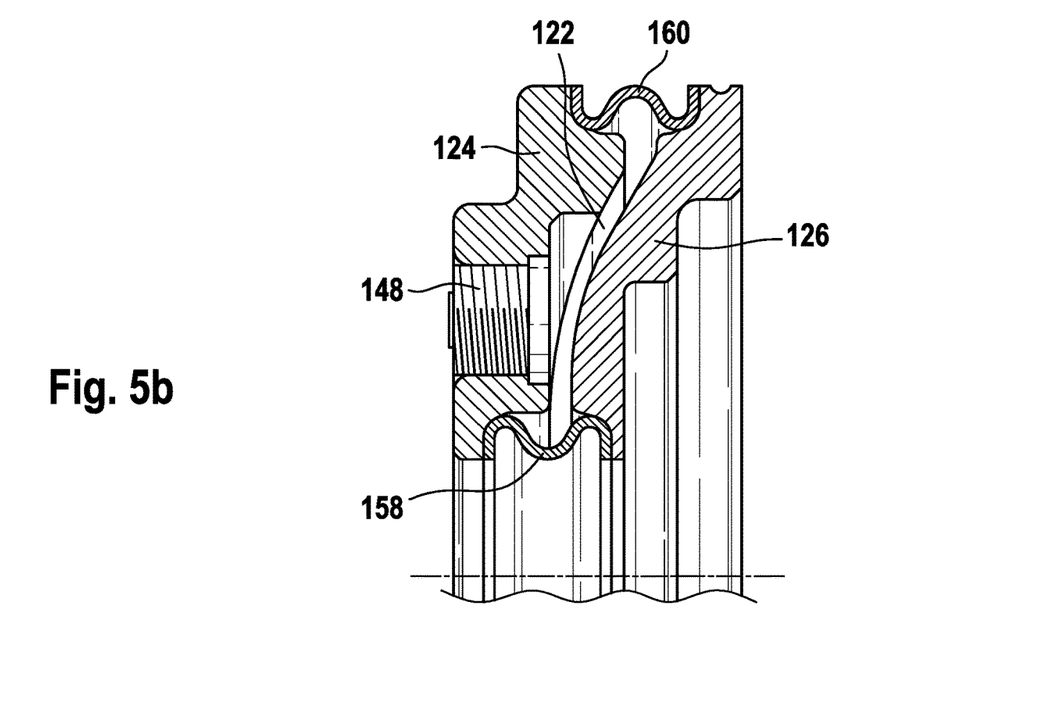

In this embodiment too, the pressure sleeves 124 and 126 here also each have centered openings 144 through which the threaded spindle 116 extends. The membranes 158 and 160 designed as bellows are here arranged on the radial outer edges of the plate shape of the pressure sleeves and on the rims of the centered opening 144. The membranes 158 and 160 are here moreover preferably designed such that, although they permit movement of the second pressure sleeve 126 toward the first pressure sleeve 124 within narrow limits, when there are significant changes in pressure inside the cavity 122 they do not bulge radially outward or inward such that a force acting on the cavity 122 is reproduced completely as a change in pressure in the cavity 122.

The pressure sensor 148 for detecting the pressure prevailing in the cavity 122 is here arranged inside the plate surface of the first pressure sleeve 124 between the membranes 158 and 160. The pressure sensor 148 can here be screwed for example into a corresponding recess 162 such that it can be replaced easily, for example when it is defective.

Figure 6A:
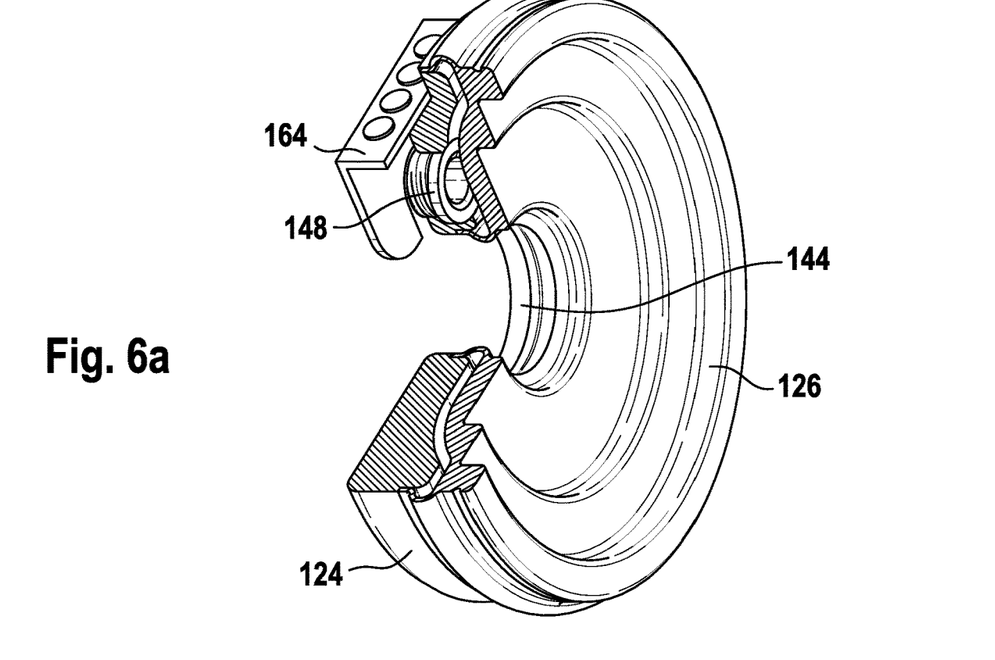
FIG. 6 shows detailed views for the arrangement of a pressure sensor in the pressure sleeves of FIGS. 4 and 5.
Figure 6B:
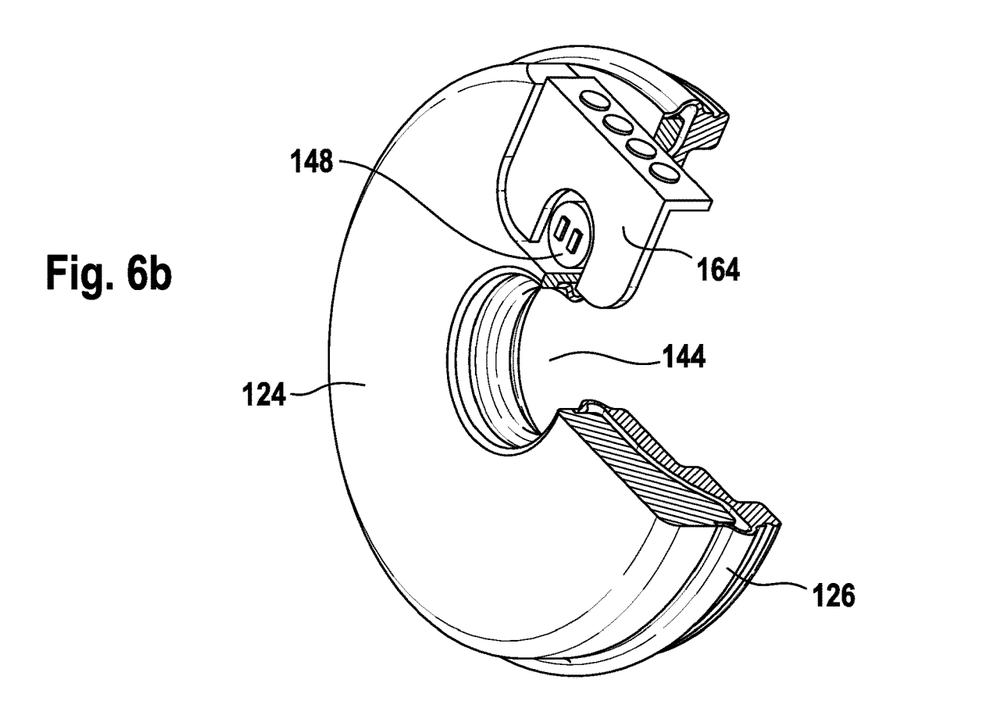

Lastly, FIG. 6 shows two further perspective illustrations of the arrangement consisting of the first and second pressure sleeve 124 and 126 with a pressure sensor 148 arranged therein. The interface 164 of the pressure sensor 148 via which calculated pressure information can be communicated to a regulator of the brake device 100 is moreover illustrated here in FIG. 6.

The invention claimed is:

1. An electromechanical brake device with a brake caliper comprising:
   - a pressure piston mounted in the brake caliper such that it can move in a clamping direction;
   - an electromechanical clamping device for the brake device, wherein the clamping device is supported, on one side, on the pressure piston and is designed to apply to the pressure piston a force acting in the clamping direction;
   - at least one hydraulically sealed, fluid-filled cavity of the brake device, wherein the clamping device is supported, on another side, indirectly on the brake caliper via the fluid-filled cavity; and
   - a pressure sensor hydraulically connected to the fluid-filled cavity and designed to calculate the fluid pressure inside the fluid-filled cavity;
   - wherein the clamping device has an electromotively driven threaded spindle and a spindle nut, wherein the spindle nut is supported on the pressure piston in the clamping direction and wherein the threaded spindle is supported on the brake caliper counter to the clamping direction via the fluid-filled cavity; and
   - wherein the threaded spindle has a first longitudinal section with a first diameter and a second longitudinal section adjoining the first longitudinal section, wherein an external thread with a diameter greater than the first diameter is formed in the second longitudinal section.

2. The electromechanical brake device as claimed in claim 1, wherein the spindle nut is arranged at least partially in a recess inside the pressure piston.

3. The electromechanical brake device as claimed in claim 1, wherein a support ring is arranged on the first longitudinal section of the threaded spindle, wherein the internal diameter of the support ring is smaller than the external diameter of the second longitudinal section of the threaded spindle such that the threaded spindle is supported indirectly on the brake caliper via the support ring counter to the clamping direction via the fluid-filled cavity.

4. The electromechanical brake device as claimed in claim 1, wherein the fluid-filled cavity is formed between a first and a second pressure sleeve, wherein the first pressure sleeve is supported on the brake caliper counter to the clamping direction, while the second pressure sleeve is supported on the clamping device in the clamping direction.

5. The electromechanical brake device as claimed in claim 4, wherein the first pressure sleeve and the second pressure sleeve each have an opening, wherein the clamping device extends through the opening.

6. The electromechanical brake device as claimed in claim 4, wherein the second pressure sleeve is mounted in the first pressure sleeve such that it is displaceable in the clamping direction.

7. The electromechanical brake device as claimed in claim 6, wherein the second pressure sleeve is mounted on plain bearings on the first pressure sleeve on at least two bearing faces, wherein sealing elements which seal the cavity formed between the pressure sleeves fluidtightly are arranged in the region of the bearing faces on at least one of the first pressure sleeve and the second pressure sleeve.

8. The electromechanical brake device as claimed in claim 4, wherein the first pressure sleeve and the second pressure sleeve each have a pot-shaped design, wherein at least part of the clamping device extends inside the pot shape.

9. The electromechanical brake device as claimed in claim 8, wherein the pressure sensor is arranged in a side wall of the pot shape of the first pressure sleeve.

10. The electromechanical brake device as claimed in claim 4, wherein the first pressure sleeve and the second pressure sleeve each have a plate-shaped design, wherein the pressure sleeves are connected to each other via membranes at their radial outer rims and at the rims of their respective openings such that the cavity formed between the pressure sleeves is sealed fluidtightly by the membranes.

11. The electromechanical brake device as claimed in claim 10, wherein the pressure sensor is arranged in the plate shape of the first pressure sleeve between the membranes.

12. The electromechanical brake device as claimed in claim 4, wherein the pressure sensor is screwed into the first pressure sleeve.

13. An electromechanical brake device with a brake caliper comprising:
   - a pressure piston mounted in the brake caliper such that it can move in a clamping direction;
   - an electromechanical clamping device for the brake device, wherein the clamping device is supported, on one side, on the pressure piston and is designed to apply to the pressure piston a force acting in the clamping direction;
   - at least one hydraulically sealed, fluid-filled cavity of the brake device, wherein the clamping device is supported, on another side, indirectly on the brake caliper via the fluid-filled cavity; and
   - a pressure sensor hydraulically connected to the fluid-filled cavity and designed to calculate the fluid pressure inside the fluid-filled cavity;
   - wherein the fluid-filled cavity is formed between a first and a second pressure sleeve, wherein the first pressure sleeve is supported on the brake caliper counter to the clamping direction, while the second pressure sleeve is supported on the clamping device in the clamping direction; and
   - wherein the first pressure sleeve is fastened on the brake caliper.

14. The electromechanical brake device as claimed in claim 13, wherein the first pressure sleeve and the second pressure sleeve each have an opening, wherein the clamping device extends through the opening.

15. The electromechanical brake device as claimed in claim 13, wherein the second pressure sleeve is mounted in the first pressure sleeve such that it is displaceable in the clamping direction.

16. The electromechanical brake device as claimed in claim 15, wherein the second pressure sleeve is mounted on plain bearings on the first pressure sleeve on at least two bearing faces, wherein sealing elements which seal the cavity formed between the pressure sleeves fluidtightly are arranged in the region of the bearing faces on at least one of the first pressure sleeve and the second pressure sleeve.

17. The electromechanical brake device as claimed in claim 13, wherein the first pressure sleeve and the second pressure sleeve each have a pot-shaped design, wherein at least part of the clamping device extends inside the pot shape.

18. The electromechanical brake device as claimed in claim 17, wherein the pressure sensor is arranged in a side wall of the pot shape of the first pressure sleeve.

19. The electromechanical brake device as claimed in claim 13, wherein the first pressure sleeve and the second pressure sleeve each have a plate-shaped design, wherein the pressure sleeves are connected to each other via membranes at their radial outer rims and at the rims of their respective openings such that the cavity formed between the pressure sleeves is sealed fluidtightly by the membranes.

20. The electromechanical brake device as claimed in claim 19, wherein the pressure sensor is arranged in the plate shape of the first pressure sleeve between the membranes.

21. The electromechanical brake device as claimed in claim 13, wherein the pressure sensor is screwed into the first pressure sleeve.

* * * * *